United States Patent
Kazakevich et al.

(10) Patent No.: US 7,343,180 B2
(45) Date of Patent: Mar. 11, 2008

(54) WIRELESS TRANSMIT/RECEIVE UNITS HAVING MULTIPLE RECEIVERS AND METHODS

(75) Inventors: Leonid Kazakevich, Plainview, NY (US); Fatih Ozluturk, Port Washington, NY (US); Alpaslan Demir, Commack, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 579 days.

(21) Appl. No.: 10/713,601

(22) Filed: Nov. 14, 2003

(65) Prior Publication Data

US 2004/0106441 A1    Jun. 3, 2004

Related U.S. Application Data

(60) Provisional application No. 60/427,127, filed on Nov. 15, 2002.

(51) Int. Cl.
*H04M 1/00* (2006.01)
*H04B 1/16* (2006.01)
*H04B 7/08* (2006.01)

(52) U.S. Cl. .................. 455/574; 455/343.2; 455/132

(58) Field of Classification Search ............... 455/572, 455/343.1, 343.6, 132, 133, 134, 101, 524, 455/574; 375/345
See application file for complete search history.

(56) References Cited

U.S. PATENT DOCUMENTS

| | | | |
|---|---|---|---|
| 5,448,773 A | | 9/1995 | McBurney et al. |
| 5,566,364 A | * | 10/1996 | Mizoguchi et al. .......... 455/132 |
| 6,236,674 B1 | | 5/2001 | Morelli et al. |
| 6,584,331 B2 | | 6/2003 | Ranta |
| 6,600,907 B1 | * | 7/2003 | Taguchi ....................... 455/132 |
| 6,606,490 B1 | | 8/2003 | Rainish et al. |
| 6,628,698 B1 | * | 9/2003 | Oda ............................ 375/147 |
| 6,944,207 B2 | * | 9/2005 | Ohno ........................... 375/148 |
| 7,031,757 B2 | * | 4/2006 | Schwengler et al. ........ 455/572 |
| 2003/0124999 A1 | | 7/2003 | Parssinen et al. |

FOREIGN PATENT DOCUMENTS

GB    2345416    7/2000

* cited by examiner

*Primary Examiner*—Tilahun Gesesse
(74) *Attorney, Agent, or Firm*—Volpe and Koenig, P.C.

(57) ABSTRACT

A wireless transmit/receive unit (WTRU) has multiple receivers with an interface to combine received signals to provided enhanced reception. A control unit selectively controls the powering of the receivers to limit power consumption based on selected parameters.

18 Claims, 1 Drawing Sheet

WIRELESS TRANSMIT/RECEIVE UNITS HAVING MULTIPLE RECEIVERS AND METHODS

CROSS REFERENCE TO RELATED APPLICATION(S)

This application claims priority from U.S. provisional 60/427,127 filed on Nov. 15, 2002 which is incorporated by reference as if fully set forth herein.

FIELD OF INVENTION

This application relates to wireless transmit/receive units (WTRUs) for use in wireless communication system environments and in particular to WTRUs that have diversity reception of wireless communication signals through the use of multiple receivers.

BACKGROUND OF THE INVENTION

Wireless communication systems are well known in the art. Generally, such systems comprise communication stations or units which transmit and receive wireless communication signals between each other. For network systems such as mobile cellular systems, there are typically two types of communication stations, namely, base stations which provide access to the network infrastructure and wireless transmit/receive units (WTRUs) which conduct wireless communications with the base stations.

The term base station as used herein includes, but is not limited to, a base station, Node-B, site controller, access point or other interfacing device in a wireless environment that provides WTRUs with wireless access to a network with which the base station is associated.

The term WTRU as used herein includes, but is not limited to, a user equipment, mobile station, fixed or mobile subscriber unit, pager, or any other type of device capable of operating in a wireless environment. WTRUs include personal communication devices, such as phones, video phones and Internet ready phones that have network connections. In addition, WTRUs include portable personal computing devices, such as PDAs and notebook computers with wireless modems that have similar network capabilities. WTRUs that are portable or can otherwise change location are referred to as mobile units.

Typically, a network of base stations is provided where each base station is capable of conducting concurrent wireless communications with appropriately configured WTRUs. Some WTRUs are configured to conduct wireless communications directly between each other, i.e. without being relayed through a network via a base station. This is commonly called peer to peer wireless communications. WTRUs can be configured for use in multiple networks with both network and peer to peer communications capabilities.

In order to provide global connectivity for wireless systems, standards have been developed and are being implemented. One current standard in widespread use is known as Global System for Mobile Telecommunications (GSM). This is considered as a so-called Second Generation mobile radio system standard (2G) and was followed by its revision (2.5G). GPRS and EDGE are examples of 2.5G technologies that offer relatively high speed data service on top of (2G) GSM networks. Each one of these standards sought to improve upon the prior standard with additional features and enhancements. In January 1998, the European Telecommunications Standard Institute—Special Mobile Group (ETSI SMG) agreed on a radio access scheme for Third Generation Radio Systems called Universal Mobile Telecommunications Systems (UMTS). To further implement the UMTS standard, the Third Generation Partnership Project (3GPP) was formed in December 1998. 3GPP continues to work on a common third generational mobile radio standard.

One type of wireless system, called a wireless local area network (WLAN), can be configured to conduct wireless communications with WTRUs equipped with WLAN modems that are also able to conduct peer to peer communications with similarly equipped WTRUs. A popular wireless local area network environment with one or more WLAN access points, i.e., base stations, is built according to the IEEE 802.11b standard. The wireless service areas for such WLANs may be restricted to specified well defined geographic areas known as "hot spots". Such wireless communication systems are advantageously deployed in areas such as airports, coffee shops, and hotels. Access to these networks usually requires user authentication procedures. Protocols for such systems are not yet fully standardized in the WLAN technology area, since the IEEE 802 family of standards is evolving.

In order to provide mobility, it is well known to provide battery operated units. As mobile units travel through different wireless service areas or in relation to other WTRUs to which they may directly connect, wireless signal strength and quality will change for a variety of reasons such as relative distance, obstructions and interference from other WTRUs and other sources. Also, in a network setting, a base station may seek to reduce the strength of its signal to a WTRU which is not moving in order to reduce interference to enable an increase in wireless traffic in the particular area.

Reception of wireless signals can be enhanced by providing communication stations with more than one receiver and combining signals received signals processed by the multiple receivers. Communication stations having two receivers generally realize increased signal gain in a combined signal compared to an equivalent single receiver station. Increase gain on the order of 4-7 db is normally achievable where two receivers are used instead of one; even higher gain increases can be realized with more than two receivers. However, using multiple receivers increases a communication station's power consumption, which makes the use of multiple receivers in battery operated mobile units less attractive. The inventors have recognized that it would be desirable to provide a mobile WTRU having enhanced reception capabilities without an inordinate increase in power consumption.

SUMMARY

The present invention provides a wireless transmit/receive unit (WTRU) that has multiple receivers that are selectively operable to conserve power.

In a preferred configuration, the WTRU has a plurality of receivers for processing wireless communication signals for producing respective versions of a wireless communication intended for reception by the WTRU. An interface is coupled to the receivers and is configured to combine respective versions of a wireless communication and produce a combined version of the wireless communication. A selectively controllable power supply unit powers each of the receivers. A control unit is coupled with the receivers, the interface and the power supply unit. The control unit is configured to monitor predetermined parameters to thereby selectively control the powering of the receivers based on predetermined thresholds such that selected receivers are not powered under predetermined conditions when it is desirable to limit energy consumption.

Preferably, the interface includes received signal power monitoring circuitry configured to output a received signal power indication. The control unit is then configured to utilize a predetermined received signal power level as one threshold for controlling the powering of the receivers such that at least one receiver is not powered when the received signal power indication output by the interface exceeds the received signal power level threshold. Alternatively or in combination with such a configuration, the interface can include received signal Quality of Service (QoS) monitoring circuitry configured to output a received signal QoS indication. The control unit is then configured to utilize a predetermined received signal QoS level as one threshold for controlling the powering of the receivers such that at least one receiver is not powered when the QoS indication output by the interface exceeds the received signal QoS level threshold. Where both power and QoS are monitored, the control unit is preferably configured to utilize a predetermined combination of received signal power level and received signal QoS level as one threshold for controlling the powering of the receivers such that at least one receiver is not powered when the combination of the received signal power and QoS indications output by the interface exceeds the received signal combination threshold.

Preferably, the power supply unit is adapted for one or more batteries and includes a battery charge monitoring device configured to output a battery charge indication. The control unit is then configured to utilize a predetermined charge level as one threshold for controlling the powering of the receivers such that at least one receiver is not powered when the charge indication output by the power supply unit falls below the charge level threshold. To ready the WTRU for use, the power supply unit includes a charged battery. Also, the power supply unit can include a line-in power input and can be configured to output an override signal when power is supplied via the line-in input. The control unit is then preferably configured to maintain power to all receivers in response to receiving the override signal from the power supply unit.

In a preferred embodiment, the WTRU has a primary receiver that is powered in a manner not controlled by the control unit and a secondary receiver that is powered in a manner controlled by the control unit. Also, one preferred context is where the WTRU is configured as a mobile unit for use in a Code Division Multiple Access (CDMA) wireless communication system. Additionally, for facilitating the manufacture and maintaining a relatively low cost of the WTRU, the control unit and the interface are preferably implemented on an application specific integrated circuit (ASIC).

A power conservation method for a wireless transmit/receive unit (WTRU) having a plurality of receivers is provided. Where the WTRU has an interface coupled to the receivers configured to combine respective versions of a wireless communication and a power supply unit for powering each of the receivers, the interface and the power supply unit are used to monitor predetermined parameters. The powering of the receivers is then selectively controlled based on predetermined thresholds such that selected receivers are not powered under predetermined conditions when it is desirable to limit energy consumption.

The method preferably includes monitoring received signal power and utilizing a predetermined received signal power level as one threshold for controlling the powering of the receivers such that at least one receiver is not powered when the monitored received signal power exceeds the received signal power level threshold. Alternatively or in addition, the method can include monitoring received signal Quality of Service (QoS) and utilizing a predetermined received signal QoS level as one threshold for controlling the powering of the receivers such that at least one receiver is not powered when the monitored QoS exceeds the received signal QoS level threshold. Where both are monitored, the method can include utilizing a predetermined combination of received signal power level and received signal QoS level as one threshold for controlling the powering of the receivers such that at least one receiver is not powered when the combination of the monitored received signal power and QoS exceeds the received signal combination threshold.

Where the power supply unit is adapted for one or more batteries, the method preferably includes monitoring battery charge and utilizing a predetermined charge level as one threshold for controlling the powering of the receivers such that at least one receiver is not powered when the monitored battery charge falls below the charge level threshold. Where the power supply unit includes a line-in power input, the method can include generating an override signal when power is supplied via the line-in input and maintaining power to all receivers in response to the override signal generation.

Other objects and advantages of the present invention will be apparent to persons skilled in the art from the following description and accompanying drawings.

DETAILED DESCRIPTION OF EMBODIMENT

Figure 1:
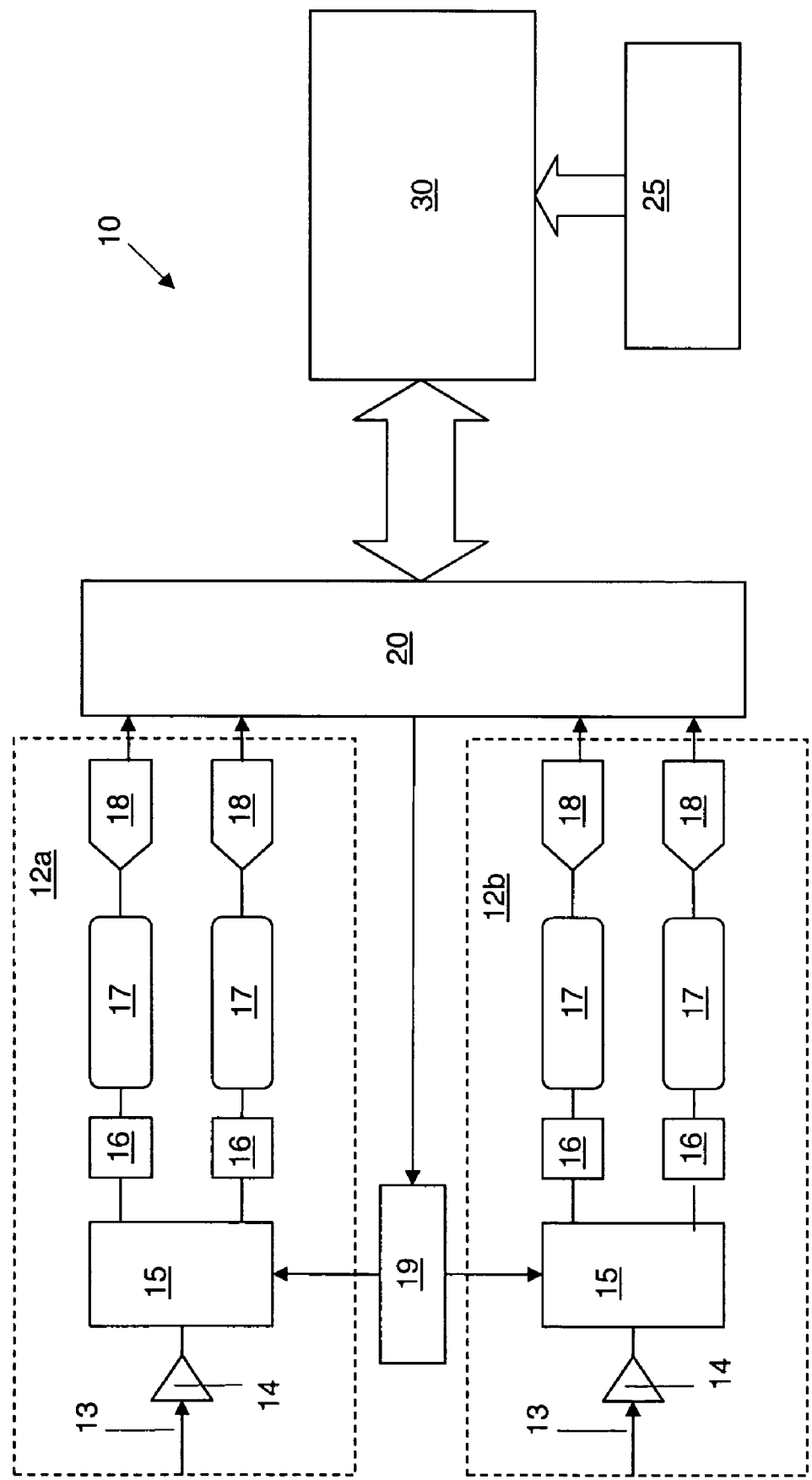
FIG. 1 is a diagrammatic illustration of a wireless transmit/receive unit (WTRU) having a plurality of receiver components interfaced with power control responsive to signal monitoring in accordance with the teachings of the present invention.

The terms base station, wireless transmit/receive unit (WTRU) and mobile unit are used in their general sense. The term base station as used herein includes, but is not limited to, a base station, Node-B, site controller, access point, or other interfacing device in a wireless environment that provides WTRUs with wireless access to a network with which the base station is associated.

The term WTRU as used herein includes, but is not limited to, user equipment (UE), mobile station, fixed or mobile subscriber unit, pager, or any other type of device capable of operating in a wireless environment. WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units.

The present invention provides a WTRU with enhanced reception capabilities through the inclusion of multiple receiver components that have an associated power control to limit power consumption. The use of two or more receivers in a WTRU serves to enhance reception performance, enable reception of transmissions of reduced power and support higher data per bandwidth. The invention is particularly useful when used in conjunction with mobile units, i.e., mobile WTRUs that are operated on battery power.

Referring to FIG. 1, an example WTRU 10 is shown that has two receiver components 12a, 12b. The receivers are configured for reception of one or more types of wireless communications as desired. The example of FIG. 1 illustrates receivers 12a, 12b configured for reception of Code Division Multiple Access (CDMA) wireless communication signals. As such, the receivers 12a, 12b have an input 13 that is coupled to a receiving antenna system. Each receiver can be coupled to a different antenna system to provide a degree of spatial diversity or a common antenna system can be employed for all of the WTRU's receivers. A preferred antenna system includes a "smart" or phased-array antenna system where a directional reception beam can be selectively formed to enhance reception and limit interference to other WTRUs and base stations.

In the example CDMA receivers 12a, 12b, the input received signals are passed to conventional component such as an amplifier 14 which feed an in-phase and quadrature mixing component 15 which produces in-phase and quadrature (I and Q) versions of the received communication signals. The I and Q component signals are each processed in a conventional manner through a filter component 16, a base band amplifier 17 and analog to digital converter 18.

A processed signal interface 20 is provided that not only combines the processed I and Q signal components in a conventional manner to produce a received user data signal for each receiver, but also collectively combines the processed signal from both receivers to provide an increased gain signal when both receivers are operated. For CDMA type receivers, the interface 20 also preferably provides data for a conventional phase lock loop control 19 that appropriately adjusts the phase of the signals when formed into the I and Q components. Regardless of the specific type of receivers employed, the interface 20 collectively combines the processed signal from all operational receivers incorporated into the WTRU to provide an increased gain signal when at least two receivers are operated.

The WTRU includes a power supply unit 25 and control component 30. Typically, the power supply will include a battery pack or similar device, but may be an alternate type of energy source such as a solar cell or other energy supply suitable for a mobile WTRU. Combination and alternative energy source selection can readily be used. For example, the power supply unit 25 can include a solar cell configured to supplement battery power where the configuration includes an override of both battery and solar power when a line-in power source is connected, such as a typical A/C adapter.

The control component 30 operatively associated with the receivers 12a, 12b and the power supply unit 25. The control component 30 is configured to evaluate the quality of the received signals and other parameters such as power supply source and/or state and to control the powering of the receivers based thereon. Generally, the control component 30 monitors signal quality of the received communication signals. With secondary receivers being active, if the monitored signal power is high, and the signal is of good quality, then, some or all of the secondary receivers are turned off to save power. However, when the monitored signal quality is poor and is low in power, steps are taken to increase the signal quality by powering the secondary receivers and combining multiple receptions of the received poor quality signals.

The WTRU can be configured so that one receiver is designated as a primary receiver that is always on when the WTRU is on and the control component 30 only controls the powering of one or more additional receivers incorporated in the WTRU. However, the control component can be configured to control the power to all receivers and to make a hierarchical selection of which receivers to power based on the type of signals being received or for which the WTRU is monitoring for potential reception. Where the WTRU is configured for use in multiple types of networks, a different hierarchy of receivers to be powered can be selected based upon in which type of network the WTRU is communicating.

The control component 30 can include a modem and other circuitry to make power measurements, channel quality estimation and to provide inputs to a decision block to enable power management. The control component is preferably configured to selectively power the receivers when the WTRU operates on battery power and to power all of the receivers when the WTRU is connected to an external power source, such as via an A/C adapter.

Preferably, one receiver is set as a default receiver which is at least initially set to an on state when the WTRU is activated. Thereafter the control component 30 operates to determine which of the receivers are powered in order to conserve power consumption. The control component can have a variety of manual and/or automatic settings. For one setting, all of the receivers can be powered in an acquisition mode so that the WTRU is prepared to answer any communications directed to it. After the acquisition of a wireless communication, some or all of the secondary receivers are deactivated to conserve power based upon the quality and power of the received signal so that at least a predetermined minimum quality of service is maintained. Quality of service is monitored as a wireless communication is continued to be conducted so that one or more receivers are reactivated during the communication when the quality of the communication degrades below a predetermined threshold.

A power conservation setting can be provided that can be manually operated to limit the powering of the receivers to only powering of the default receiver, thus preventing the additional receivers from consuming any power. Preferably, the control component 30 monitors battery power and automatically limits the number of receivers that can be activated when as the charge state of the battery decreases below predetermined levels. A manual override of this type of automatic setting can be provided to enable the user of the WTRU to obtain optimum reception performance at the cost of faster battery power consumption.

For WTRU's used in a network environment, the control component 30 can monitor both signal quality of the received communication signals and a reverse power control state. Reverse power control is also called as Uplink Power Control that increases or reduces the WTRU transmit power level based on the signal strength measured at a base station in order to maintain the Quality of Service constant (QoS). The received signal power at the base station can be made constant via open or closed loop power control. When the WTRU is very close to the base station, to achieve a given QoS, the WTRU will normally only need to transmit at a very low power level. However, when WTRU is far away from the base station, the WTRU will be required to transmit a significantly higher level to achieve the given QoS.

Where the control component 30 is configured to monitor both signal quality of the received communication signals and a reverse power control state, a setting is preferably provided where powering of the secondary receivers is based on the signal quality and the reverse power control state. When the received signal is too high, and/or, the reverse power control reaches a lower limit, then, some or all of the secondary receivers are deactivated.

In a preferred construction, the control unit 30 and interface 20 of FIG. 1 are implemented on an single integrated circuit, such as an application specific integrated circuit (ASIC), although the components may be on multiple separate integrated circuits. The receiver components can also be implemented on such a single integrated circuit, although multiple integrated circuits may be used.

The present invention can be implemented in WTRUs for any wireless communications network system, such as a time division duplex (TDD) or frequency division duplex (FDD) wireless telephone system where the WTRUs which communicate with network base stations. The WTRUs may also be also capable of peer to peer communications. However, this as not limiting and the invention may be implemented with WTRUs employing other types of network or peer to peer communication systems, such as, for example, in WTRUs in the form of WLAN modem equipped WTRUs employing 801.11 technology for peer to peer communications. Other variations and modifications consistent with the invention will be recognized by those of ordinary skill in the art.

What is claimed is:

1. A wireless transmit/receive unit (WTRU) comprising:
   a plurality of receivers, each configured to receive and process wireless communication signals and to produce respective received signal versions of a wireless communication intended for reception by the WTRU;
   an interface coupled to the receivers configured to combine respective received signal versions of a wireless communication and to produce a combined version of the wireless communication;
   a selectively controllable power supply unit configured to power each of the receivers;
   a control unit coupled with the receivers, the interface and the power supply unit and configured to monitor predetermined parameters to thereby selectively control the powering of the receivers based on predetermined thresholds such that selected receivers are not powered under predetermined conditions when it is desirable to limit energy consumption; and
   a primary receiver that is powered in a manner not controlled by the control unit and a secondary receiver that is powered in a manner controlled by the control unit.

2. The WTRU according to claim 1 wherein the interface includes received signal power monitoring circuitry configured to output a received signal power indication and the control unit is configured to utilize a predetermined received signal power level as one threshold for controlling the powering of the receivers such that at least one receiver is not powered when the received signal power indication output by the interface exceeds the received signal power level threshold.

3. The WTRU according to claim 2 wherein the interface includes received signal Quality of Service (QoS) monitoring circuitry configured to output a received signal QoS indication and the control unit is configured to utilize a predetermined received signal QoS level as one threshold for controlling the powering of the receivers such that at least one receiver is not powered when the QoS indication output by the interface exceeds the received signal QoS level threshold.

4. The WTRU according to claim 3 wherein the control unit is configured to utilize a predetermined combination of received signal power level and received signal QoS level as one threshold for controlling the powering of the receivers such that at least one receiver is not powered when the combination of the received signal power and QoS indications output by the interface exceeds the received signal combination threshold.

5. The WTRU according to claim 1 wherein the interface includes received signal Quality of Service (QoS) monitoring circuitry configured to output a received signal QoS indication and the control unit is configured to utilize a predetermined received signal QoS level as one threshold for controlling the powering of the receivers such that at least one receiver is not powered when the QoS indication output by the interface exceeds the received signal QoS level threshold.

6. The WTRU according to claim 1 wherein the power supply unit is adapted for one or more batteries and includes a battery charge monitoring device configured to output a battery charge indication and the control unit is configured to utilize a predetermined charge level as one threshold for controlling the powering of the receivers such that at least one receiver is not powered when the charge indication output by the power supply unit falls below the charge level threshold.

7. The WTRU according to claim 6 wherein the power supply unit includes a battery.

8. The WTRU according to claim 6 wherein the power supply unit includes a line-in power input and is configured to output an override signal when power is supplied via the line-in input and the control unit is configured to maintain power to all receivers in response to receiving the override signal from the power supply unit.

9. The WTRU according to claim 1 configured as a mobile unit for use in a Code Division Multiple Access (CDMA) wireless communication system.

10. The WTRU according to claim 1 wherein the control unit and the interface are implemented on an application specific integrated circuit (ASIC).

11. In a wireless transmit/receive unit (WTRU) having a plurality of receivers, each configured to receive and process wireless communication signals and to produce respective received signal versions of a wireless communication intended for reception by the WTRU, an interface coupled to the receivers configured to combine respective received signal versions of a wireless communication and produce a combined version of the wireless communication and a power supply unit for powering each of the receivers, a power conservation, the method comprising:
   using the interface and the power supply unit to monitor predetermined parameters; and
   selectively controlling the powering of the receivers based on predetermined thresholds such that selected receivers are not powered under predetermined conditions when it is desirable to limit energy consumption, wherein the WTRU has a primary receiver and a secondary receiver, further comprising maintaining the powering of the primary receiver irrespective of predetermined thresholds and selectively controlling the Powering of the secondary receiver based on the predetermined thresholds such that the secondary receiver is not powered under predetermined conditions when it is desirable to limit energy consumption.

12. The method according to claim 11 including monitoring received signal power and utilizing a predetermined received signal power level as one threshold for controlling the powering of the receivers such that at least one receiver is not powered when the monitored received signal power exceeds the received signal power level threshold.

13. The method according to claim 12 including monitoring received signal Quality of Service (QoS) and utilizing a predetermined received signal QoS level as one threshold for controlling the powering of the receivers such that at least one receiver is not powered when the monitored QoS exceeds the received signal QoS level threshold.

14. The method according to claim 13 including utilizing a predetermined combination of received signal power level and received signal QoS level as one threshold for controlling the powering of the receivers such that at least one receiver is not powered when the combination of the monitored received signal power and QoS exceeds the received signal combination threshold.

15. The method according to claim 11 including monitoring received signal Quality of Service (QoS) and utilizing a predetermined received signal QoS level as one threshold for controlling the powering of the receivers such that at least one receiver is not powered when the monitored QoS exceeds the received signal QoS level threshold.

16. The method according to claim 11, wherein the power supply unit is adapted for one or more batteries, including monitoring battery charge and utilizing a predetermined charge level as one threshold for controlling the powering of the receivers such that at least one receiver is not powered when the monitored battery charge falls below the charge level threshold.

17. The method according to claim 16, wherein the power supply unit includes a line-in power input, further comprising generating an override signal when power is supplied via the line-in input and maintaining power to all receivers in response to the override signal generation.

18. The method according to claim 11, wherein the WTRU is a mobile unit, further comprising using the WTRU for wireless communication in a Code Division Multiple Access (CDMA) wireless communication system.

* * * * *

UNITED STATES PATENT AND TRADEMARK OFFICE
CERTIFICATE OF CORRECTION

| | | |
|---|---|---|
| PATENT NO. | : 7,343,180 B2 | |
| APPLICATION NO. | : 10/713601 | |
| DATED | : March 11, 2008 | |
| INVENTOR(S) | : Kazakevich et al. | |

It is certified that error appears in the above-identified patent and that said Letters Patent is hereby corrected as shown below:

Title page, item (57), ABSTRACT, page 1, right column, line 3, before the word "enhanced", delete "provided" and insert therefor --provide--.

At column 2, line 39, before the word "gain", delete "Increase" and insert therefor --Increased--.

At column 5, line 49, before the word "operatively" insert --is--.

At column 6, line 22, before the word "power", delete "conserve" and insert therefor --reduce--.

At column 6, line 41, after the word "when", delete "as".

At column 6, line 45, after the word "of", delete "faster" and insert --increased--.

At column 6, line 49, after the word "called", delete "as".

At column 6, line 58, after the word "transmit", insert --at--.

At column 7, line 2, before the word "single", delete "an" and insert therefor --a--.

At column 7, line 11, after the word "WTRUs", delete "which".

At column 7, line 13, before the word "capable", delete "also".

UNITED STATES PATENT AND TRADEMARK OFFICE
CERTIFICATE OF CORRECTION

PATENT NO. : 7,343,180 B2
APPLICATION NO. : 10/713601
DATED : March 11, 2008
INVENTOR(S) : Kazakevich et al.

It is certified that error appears in the above-identified patent and that said Letters Patent is hereby corrected as shown below:

At claim 11, column 8, line 58, before the words "of the", delete "Powering" and insert therefor --powering--.

Signed and Sealed this

Twenty-second Day of July, 2008

JON W. DUDAS
*Director of the United States Patent and Trademark Office*